United States Patent [19]

Fukasawa et al.

[11] Patent Number: 4,923,679

[45] Date of Patent: May 8, 1990

[54] HOLLOW FIBER MEMBRANE TYPE OXYGENATOR AND METHOD FOR MANUFACTURING SAME

[75] Inventors: Hiromichi Fukasawa; Yoshiro Katsura, both of Fuji; Kazuhiko Hagiwara, Fujinimiya, all of Japan

[73] Assignee: Terumo Kabushiki Kaisha, Tokyo, Japan

[21] Appl. No.: 386,032

[22] Filed: Jul. 25, 1989

[30] Foreign Application Priority Data

May 24, 1984 [JP] Japan ................. 59-105384
May 25, 1984 [JP] Japan ................. 59-106278
May 25, 1984 [JP] Japan ................. 59-106279
May 26, 1984 [JP] Japan ................. 59-107179

[51] Int. Cl.$^5$ ........................... A61M 1/14
[52] U.S. Cl. ........................ 422/48; 261/122;
  261/DIG. 28; 128/DIG. 3; 55/16; 55/158;
  210/321.62; 210/321.81; 210/321.9;
  210/500.22; 210/500.23
[58] Field of Search ................. 422/46-48;
  261/122, DIG. 28; 128/DIG. 3; 55/16, 158;
  210/500.22, 500.23, 321.62, 321.81, 321.9

[56] References Cited

U.S. PATENT DOCUMENTS

| 3,520,416 | 2/1968 | Keedwell . |
| 3,969,240 | 7/1976 | Kolobow et al. ............ 422/48 X |
| 4,179,380 | 12/1979 | Amicel et al. . |
| 4,212,744 | 7/1980 | Oota . |
| 4,239,729 | 12/1980 | Hasegawa et al. . |
| 4,319,996 | 3/1982 | Vincent et al. . |
| 4,374,802 | 2/1983 | Fukasawa . |

FOREIGN PATENT DOCUMENTS

| 0005866 | 12/1979 | European Pat. Off. . |
| 048943 | 4/1982 | European Pat. Off. . |
| 0048943 | 4/1982 | European Pat. Off. . |
| 0077924 | 5/1983 | European Pat. Off. . |
| 3106188 | 8/1982 | Fed. Rep. of Germany . |
| 3413530 | 11/1984 | Fed. Rep. of Germany . |

OTHER PUBLICATIONS

Akamatsu, Kiyoshi et al., Chemical Abstracts, Jun. 27, 1979, vol. 91, p. 43, No. 141845v.
S. Sifniades et al., Hydrometallurgy, Jan. 15, 1981, "Recovery of Uranium from Phosphoric Acid by Means of Supported Liquid Membranes", pp. 202-212.
Rompps Chemisches Worterbuch, "Silicone" pp. 804-806 (1969) and partial English language translation.
Murphy et al., "Laboratory and Clinical Experience with a Microporous Membrane Oxygenator", Trans. Am. Soc. Artil. Organs, vol. XX, 1974, pp. 278-283.

Primary Examiner—Christine M. Hucker
Assistant Examiner—Lynn M. Kummert
Attorney, Agent, or Firm—Frishauf, Holtz, Goodman & Woodward

[57] ABSTRACT

A hollow fiber membrane type oxygenator is provided wherein a bundle of a plurality of hollow porous fibers presenting gas exchange membranes axially extends through a housing to define a first flow path for oxygen, a pair of partitions support the opposed open ends of the hollow fibers to isolate the open ends from the first flow path to define a second flow path through the fiber cavities for blood, and the micropores in the hollow fibers are filled with a silicone compound, for exmaple, a RTV silicone rubber or a blend thereof with a silicone oil while the hollow fibers on their side wall are substantially free of a layer of the silicone compound. The oxygenator is manufactured by prefabricating an oxygenator module of the above-mentioned construction, impregnating the hollow fibers with a solution of the silicone compound, and passing a cleaning liquid to remove excessive silicone compound, thereby filling only the micropores with the silicone compound.

17 Claims, 13 Drawing Sheets

↑ SILICONE

↑ SILICONE

F I G. 18
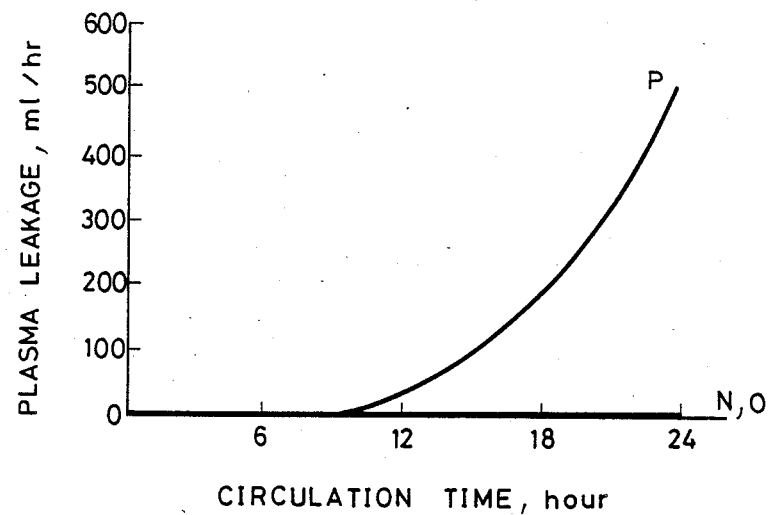

HOLLOW FIBER MEMBRANE TYPE OXYGENATOR AND METHOD FOR MANUFACTURING SAME

This is a continuation of application Ser. No. 096,753 filed Sept. 11, 1987 now abandoned.

BACKGROUND OF THE INVENTION

This invention relates to a hollow fiber membrane type oxygenator and a method for manufacturing the same.

Generally, in open-heart surgery or other surgical operations, blood from the patient is circulated and pumped through an extracorporeal circuit having an oxygenator incorporated therein for the purpose of oxygenation. One type of well-known oxygenators includes hollow fiber membrane type oxygenators which may be subdivided into two classes depending on the type of hollow fiber membrane, that is, homogeneous membranes and porous membranes. The homogeneous membranes cannot be as thin as 100 $\mu$m or less because of membrane strength since they are formed from silicone compound. The limited thickness in turn imposes a limitation on the permeation of gases, particularly carbon dioxide gas. A bundle of several ten thousand fibers to be assembled in an oxygenator becomes undesirably larger in size so that a greater volume of priming liquid is required. Additional problems are troublesome manufacture and an increased expense.

Microporous membranes allow gases to pass therethrough as a volume flow because the micropores are substantially greater in size than the molecule of passing gases. A variety of oxygenators have been proposed using microporous membranes, for example, microporous polypropylene membranes. However, the microporous membranes have high permeability to water vapor so that the performance becomes low due to water condensation and plasma can leak out of the membranes after a long term of blood circulation therethrough.

Japanese Patent Publication No. 54-17052 proposes a hollow fiber membrane comprising a hollow fiber substrate having micropores of 10 micrometers or less in diameter extending throughout the side wall wherein a gas-unpermeable thin film of methylhydrogenpolysiloxane is formed on the side wall. However, since the methylhydrogenpolysiloxane film is formed not only in the micropores, but also on the inner and outer surfaces of the hollow fiber substrates, the cavity of the hollow fiber substrates has a correspondingly reduced inner diameter, resulting in deteriorated gas exchangeability. Also, the amount or thickness of methylhydrogenpolysiloxane filled in micropores is correspondingly increased so that the membrane as a whole exhibits reduced percentage permeabilities to gases such as oxygen and carbon dioxide. The polysiloxane-coated membranes have the problem that plasma leakage occurs after a long term operation as an oxygenator although they can be sufficiently employed in aqualungs or similar equipment.

In order to overcome these problems, the applicant proposed in U.S. patent application Ser. No. 597,440 an improved oxygenator using hollow fiber-silicone composite membranes comprising hollow fibers having micropores filled with a silicone oil without forming a silicone oil layer on the side wall. This oxygenator is manufactured by prefabricating an oxygenator module having untreated hollow fibers incorporated, impregnating the hollow fibers with a silicone oil solution, removing the solution, and then passing a mixture of a solvent and a non-solvent for the silicone oil to thereby remove silicone oil deposits on the hollow fiber substrate side wall, thereby filling only the micropores with the silicone oil. The silicone oil-filled membranes are improved in plasma leakage, but have the possibility that the silicone oil will flow into the contacting blood.

SUMMARY OF THE INVENTION

It is, therefore, an object of the present invention to provide an improved hollow fiber membrane type oxygenator which has eliminated the above-mentioned drawbacks, prevents plasma leakage even after a long term of extracorporeal circulation and provides improved carbon dioxide removal and improved blood compatibility as well as compactness.

Another object of the present invention is to provide a method for manufacturing such an improved hollow fiber membrane type oxygenator.

A first aspect of the present invention is directed to a hollow fiber membrane type oxygenator comprising
a housing,
a bundle of a plurality of gas-exchange hollow fiber membranes axially extending through the housing,
a first fluid chamber defined by the outer surface of said hollow fibers and the inner surface of said housing,
a first fluid inlet and a first fluid outlet both in fluid communication with said first fluid chamber,
a partition supporting either end of said hollow fibers and isolating the fiber end from said first fluid chamber, and
a second fluid inlet and a second fluid outlet both in fluid communication with the interior space of said hollow fibers.

According to the present invention, each said hollow fiber membrane has a plurality of micropores extending throughout the membrane. The micropores are filled with a silicone compound comprising a silicone rubber or a blend thereof with a silicone oil, but the hollow fiber membrane is substantially free of a layer of said silicone compound on its side wall.

Several preferred embodiments of the present invention are described below.

(i) The silicone compound is a blend of a silicone rubber and a silicone oil in a weight ratio between 2:8 and 8:2.

(ii) The silicone rubber is a room temperature vulcanizable silica-free silicone rubber.

(iii) The room temperature vulcanizable silica-free silicone rubber is a polymer of vinylmethylsiloxane units and methylhydrogensiloxane units.

(iv) The silicone oil is dimethyl or methylphenyl silicone oil.

According to a second aspect of the present invention, each hollow fiber membrane comprises a hollow porous fiber substrate having an inner diameter of 100 to 1,000 $\mu$m, a wall thickness of 5 to 200 $\mu$m, an average pore diameter of 0.01 to 5 $\mu$m, and a porosity of 20 to 80%, and
the oxygen flow rate, $O_2$ Flux, represented by the following equation:

$$O_2 \text{ Flux} = Q/\Delta P \times A$$

is within the range from 1.0 to 50 ml/min·m$^2$·mmHg, wherein Q is a volume of oxygen permeated through the membrane expressed in ml/min., ΔP is a pressure drop across the membrane expressed in mmHg, and A is the surface area of the membrane expressed in m².

According to a third aspect of the present invention, the weight SW of the silicone compound filled in the fiber membrane micropores is within the following range:

$$\frac{\pi}{4}(D_0^2 - D_1^2) \cdot L \cdot P \cdot d \cdot$$

$$0.3 \leq SW \leq \frac{\pi}{4}(D_0^2 - D_1^2) \cdot L \cdot P \cdot d \cdot 0.9$$

with the proviso that the hollow fiber has an outer diameter $D_0$, an inner diameter $D_1$, a length L, and a porosity P, and the silicone compound has a specific gravity d.

A fourth aspect of the present invention is directed to a method for manufacturing a hollow fiber membrane type oxygenator. The oxygenator is manufactured by the steps of (1) assembling an oxygenator module comprising
a housing,
a bundle of a plurality of hollow microporous fiber substrates axially extending through the housing and presenting a corresponding plurality of microporous gas exchange membranes,
a first fluid chamber defined by the outer surface of said hollow fibers and the inner surface of said housing,
a first fluid inlet and a first fluid outlet both in fluid communication with said first fluid chamber,
a partition supporting either end of said hollow fibers and isolating the open fiber end from said first fluid chamber, and
a second fluid inlet and a second fluid outlet both in fluid communication with the interior space of said hollow fibers, (2) introducing a solution of a silicone compound comprising a silicone rubber or a blend thereof with a silicone oil in a suitable solvent into the interior space of the hollow fiber substrates for impregnation, and (3) thereafter, passing through the module a cleaning liquid comprising a non-solvent in which the silicone compound is insoluble and the solvent,
thereby filling the hollow fiber substrate micropores with the silicone compound, preferably without depositing any layer of the silicone compound on the hollow fiber substrate side wall.

Several preferred embodiments are described below.

(i) The cleaning liquid has a viscosity of at least 10 centipoise at 25° C.

(ii) The silicone compound is a blend of a silicone rubber and a silicone oil in a weight ratio between 2:8 and 8:2.

(iii) The silicone rubber is a room temperature vulcanizable silicone rubber, more preferably silica-free silicone rubber.

According to a fifth aspect of the present invention, there is provided a method for manufacturing a hollow fiber membrane type oxygenator, comprising the steps of (1) assembling an oxygenator module comprising
a housing,
a bundle of a plurality of hollow microporous fiber substrates axially extending through the housing and presenting a corresponding plurality of microporous gas exchange membranes,
a first fluid chamber defined by the outer surface of said hollow fibers and the inner surface of said housing,
a first fluid inlet and a first fluid outlet both in fluid communication with said first fluid chamber,
a partition supporting either end of said hollow fibers and isolating the open fiber end from said first fluid chamber, and
a second fluid inlet and a second fluid outlet both in fluid communication with the interior space of said hollow fibers, (2) filling one of said first and second fluid chambers with a filling liquid in which the silicone compound and the solvent are incompatible and which has a higher surface tension than the critical surface tension of said hollow fiber substrate, (3) introducing a solution of a silicone compound comprising a silicone rubber or a blend thereof with a silicone oil in a suitable solvent into the remaining fluid chamber for impregnation of the substrates while said one fluid chamber is full of the filling liquid, (4) purging the module of excessive silicone compound solution, (5) passing a cleaning liquid comprising a non-solvent for the silicone compound and the solvent through the module, and (6) purging the module of the cleaning liquid, thereby filling the hollow fiber substrate micropores substantially with the silicone compound.

Preferably, the filling liquid is selected from the group consisting of water, glycerine, ethylene glycol, diethylene glycol, aqueous ethanol, and aqueous isopropyl alcohol, and mixtures thereof.

BRIEF DESCRIPTION OF THE DRAWINGS

These and other objects, features, and advantages of the present invention will be readily understood from the following description taken in conjunction with the accompanying drawings, in which:

FIGS. 3a and 4a being elevations of the oxygenator in impregnating and cleaning steps, and FIGS. 3b and 4b being cross sections of the hollow fiber therein, respectively;

FIGS. 5a, 6a, and 7a being elevations of the oxygenator in filling, impregnating, and cleaning steps, and FIGS. 5b, 6b and 7b being cross sections of the hollow fiber therein, respectively;

FIG. 18 is a diagram showing the plasma leakage in oxygenators in Example 5 as a function of extracorporeal circulation time.

DESCRIPTION OF THE PREFERRED EMBODIMENTS

Figure 1:
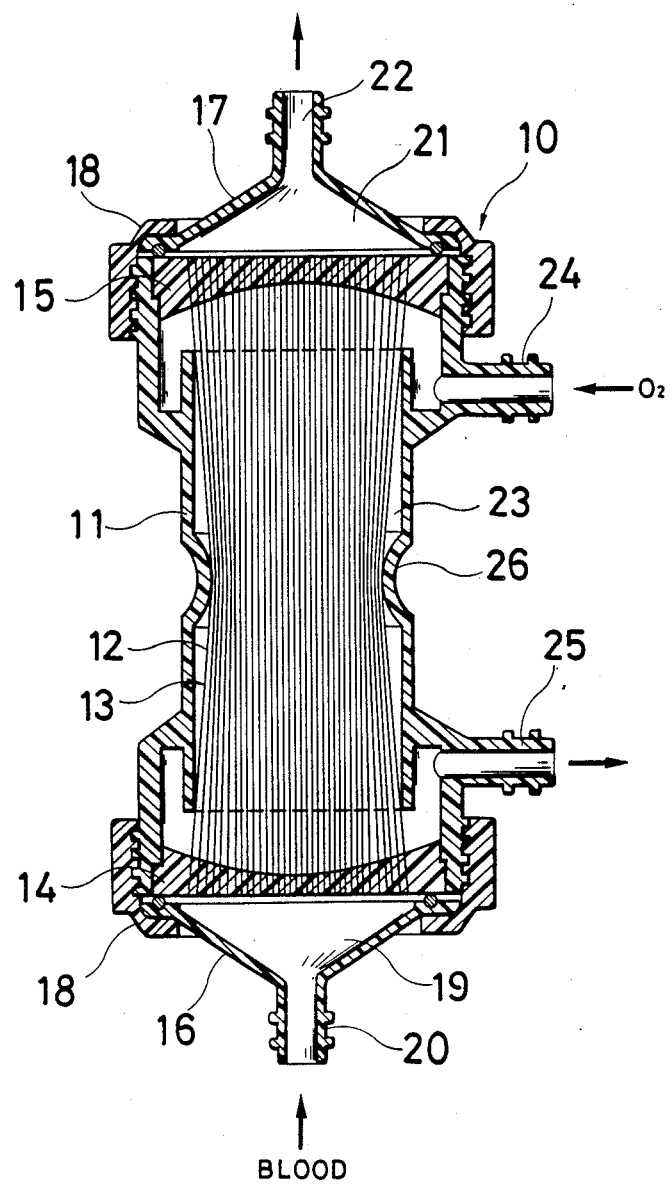
FIG. 1 is an elevational cross section of a hollow fiber membrane type oxygenator according to one embodiment of the present invention.

Referring to FIG. 1 there is schematically illustrated a hollow fiber membrane type oxygenator according to one embodiment of the present invention. The oxygenator generally designated at 10 includes a cylindrical housing 11 defining an interior space which receives therein a bundle 13 of a plurality of axially extending hollow fibers 12 each presenting a gas exchange membrane. The opposite ends of the hollow fibers 12 are fluid tightly retained by opposed partitions 14 and 15 which are fluid tightly engaged in the housing 11 at its opposite ends. The hollow fibers extend throughout the partition and preferably terminate at the outer surface of the partition. For brevity of description, the partitions 14 and 15 and the corresponding housing ends are referred to as upper and lower partitions and upper and lower housing ends.

Upper and lower conical headers 17 and 16 are fixedly secured to the opposite ends of the housing 11 by means of covers 18 threadably engaged on the housing ends, respectively.

The inner surface of the lower header 16 and the outer surface of the lower partition 14 define a second fluid incoming chamber in the form of a blood incoming chamber 19 in fluid communication with the interior space of each hollow fiber 12. The header 16 has at its apex a second fluid inlet in the form of a blood inlet 20.

The inner surface of the upper header 17 and the outer surface of the partition 15 defines a second fluid outgoing chamber in the form of a blood outgoing chamber 21 in fluid communication with the interior space of each hollow fiber 12. The header 17 has at its apex a second fluid outlet in the form of a blood outlet 22.

The inner surfaces of the partitions 14, 15, the inner wall of the housing 11, and the outer wall of the hollow fibers 12 define a first fluid chamber in the form of a gas chamber 23. The housing 11 is provided near its upper and lower ends with a first fluid inlet in the form of a gas inlet 24 and a first fluid outlet in the form of a gas outlet 25 both in fluid communication with the gas chamber 23.

Preferably, the housing 11 at its intermediate inner wall portion is provided with a throttling/retaining throat 26 having a reduced diameter for throttling the bundle 13 or reducing the diameter of the bundle. A throat zone is formed in the fiber bundle 13 at an axially intermediate portion as shown in FIG. 1. Then, the packing density of fibers 12 in the bundle 13 varies in an axial direction and is maximum at an intermediate portion.

The partitions 14 and 15 serve for the important function of isolating the interior from the exterior of the hollow fibers 12. In general, the partitions 14 and 15 are formed by casting a highly polar, high molecular weight potting agent, for example, polyurethane, silicone, and expoxy resins by the centrifugal casting process to the inner wall surface of the housing end portions where it is cured.

More illustratively, first a number of hollow fibers 12 longer than the axial length of the housing 11 are prepared, opposite open ends of the fibers are sealed with a viscous resin, and then the fibers are placed in the housing 11 in mutually juxtaposed relationship. The opposite ends of the fiber bundle are completely covered with caps. The housing 11 is rotated about its longitudinal axis while a polymeric potting compound is introduced to the opposite ends where it is cured. The caps are then removed and the edge portions of the fiber bundle bonded with the potting compound are severed with a sharp knife to expose freshly cut openings of the hollow fibers 12 at their opposite ends.

Figure 2:
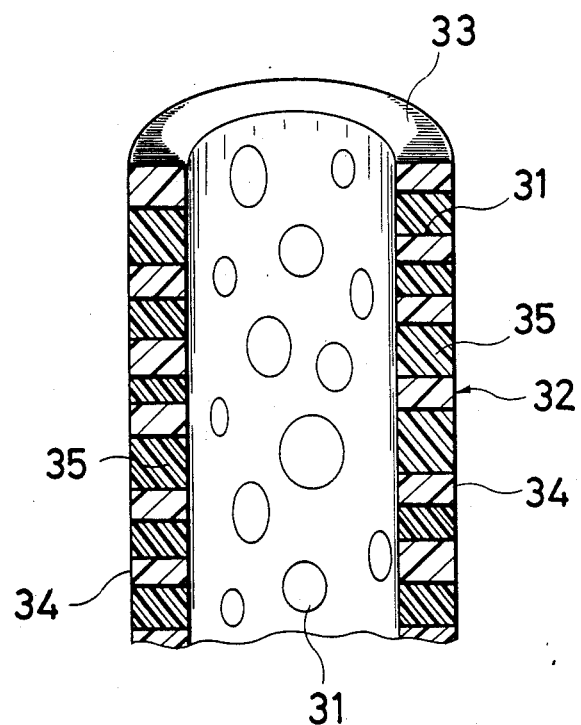
FIG. 2 is a partially cut-away, schematic illustration of a hollow fiber used in the oxygenator of the present invention.

Each of the hollow fiber membranes used in the oxygenator are hollow fiber-type gas-exchange membranes. As shown in FIG. 2, a porous hollow fiber substrate 33 has a plurality of micropores 31 penetrating through its side wall 32, the micropores 31 are filled or plugged with a silicone compound 35 comprising a silicone rubber or a mixture thereof with a silicone oil without substantially forming a silicone layer on a side wall surface 34 of the fiber substrate.

The porous hollow fiber substrates used as the base of the hollow fiber membranes may be formed of polymeric materials, for example, polypropylene, polyethylene, polytetrafluoroethylene, polysulfone, polyacrylonitrile, polyethylene terephthalate, polybutylene terephthalate, polycarbonate, polyurethane, 6,6-nylon, 6-nylon, and cellulose acetate. Among these, polyolefins are preferred and polypropylene is most preferred.

In order that the gas-exchange membranes prepared from these hollow fiber substrates may exert sufficient performance required for an oxygenator, they must meet certain limitations on membrane thickness and porosity. In general, the quantity q of a gas permeated through a membrane havinig a thickness l and a surface area A is given by the following equation.

$$q = P \cdot \Delta p \cdot A / l$$

wherein P is a coefficient of permeability to the gas, and $\Delta p$ is a pressure drop across the membrane. The hollow fiber membranes used in the practice of the present invention have the otherwise gas-permeable micropores filled with a silicone compound so that the effective membrane area is very small as compared with ordinary porous membranes. To compensate for this reduced effective area, the membrane thickness must be reduced as understood from the above equation. For this reason, the hollow fiber membranes used in the present invention may have a wall thickness l in the range of 5 to 200 $\mu$m, and preferably 10 to 50 $\mu$m.

The hollow fibers may have an inner diameter of 100 to 1,000 μm, and preferably 100 to 300 μm, and a porosity of 20 to 80%, and preferably 40 to 80%. The micropores in the side wall have a diameter of 0.01 to 5 μm, and preferably 0.01 to 1 μm.

Inner diameters of less than 100 μm increase pressure loss to cause damage to blood and such slender hollow fibers are probably clogged. Inner diameters of more than 1,000 μm will result in deteriorated performance, particularly deteriorated oxygenating ability and require an increased volume of priming fluid. With porosities of less than 20%, the effective membrane area is accordingly reduced to deteriorate gas exchange performance. The strength of the hollow fiber membrane substrate becomes low at porosities in excess of 80%.

The average diameter of micropores may be calculated according to a well-known mercury filling process or electronmicroscopy. Pore diameters of less than 0.01 μm are too small to uniformly introduce a silicone solution in pores. With pore diameters in excess of 5 μm, the cylindrical portions of the silicone compound filling in the pores are mechanically weak so that it can flow out into the surrounding fluid or blood.

Figure 3A:
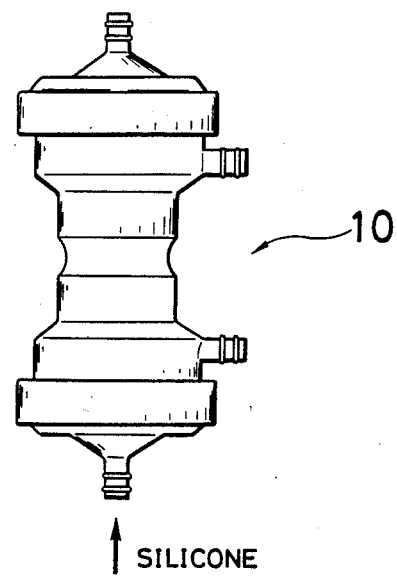
FIGS. 3a, 3b and 4a, 4b illustrate one embodiment of the method for manufacturing the oxygenator according to the present invention.
Figure 3B:
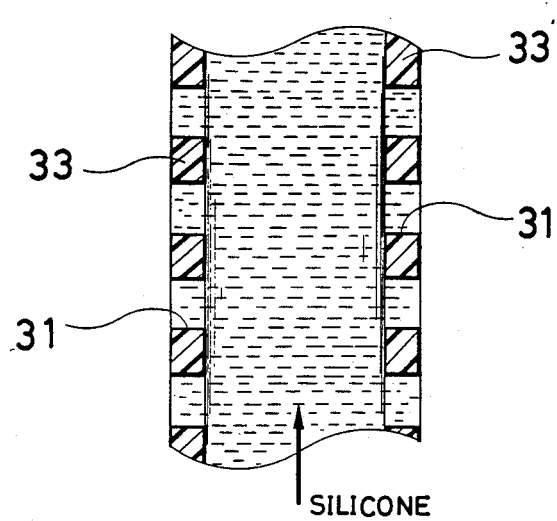
Figure 4A:
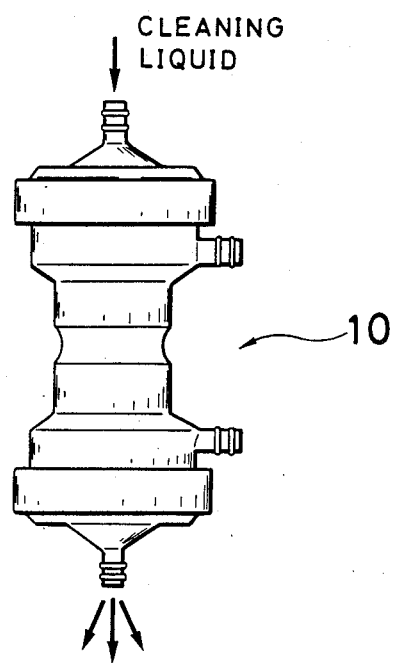
Figure 4B:
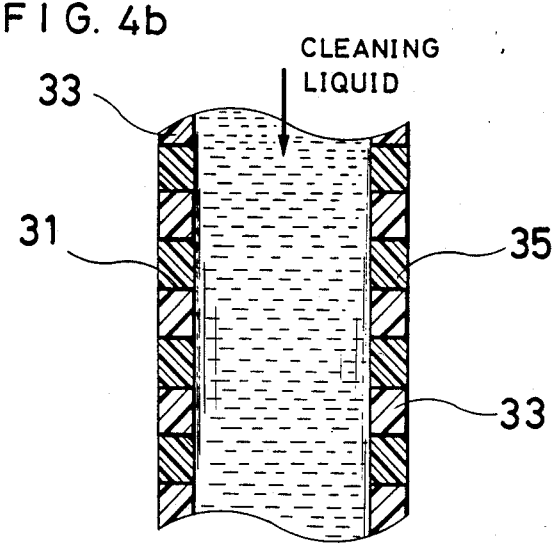

The oxygenator according to the present invention may be manufactured by first incorporating a bundle of hollow fibers into an oxygenator module as shown in FIG. 3a, and passing a silicone solution, more specifically a solution of a silicone rubber or a silicone rubber-silicone oil mixture in a suitable solvent through the module to fully impregnate the fiber or membrane substrates 33 with the solution as shown in FIG. 3b. Then a gas is passed through the module to purge it of the silicone solution as shown in FIG. 4a and a cleaning liquid is then passed through at least the interior of the hollow fibers as shown in FIG. 4b, optionally followed by heating for crosslinking.

The silicone rubbers which can be used herein may be either one-part or two-part room temperature vulcanizable (RTV) silicone rubbers. Typical of the two-part RTV silicones are solid rubbers of planar polymer structure prepared by starting with a monomer or silicone oil containing vinyl group and/or hydrogen, and effecting crosslinking between C-H after mixing. Preferred examples of the two-part RTV silicone rubbers include copolymers of vinylmethylsiloxane and methylhydrogensiloxane. Upon crosslinking for curing of these polymers, platinum group metals may be used in any form of metallic elements, oxides, and compounds, for example, chloroplatinic acid. The siloxane polymers may be cured at temperatures of about 20° to 30° C. or higher. The silicone rubbers used herein are preferably silica-free RTV rubbers from a standpoint of thrombus prevention.

The silicone compounds used herein may be silicone rubbers alone. Certain silicone rubbers, when used alone, have such a high viscosity even in solution state that they do not smoothly flow into the hollow fibers or membranes. It is thus preferred to use silicone rubbers in combination with silicone oils.

The silicone oils used herein are liquid materials having siloxane bonds, for example, dimethylsilicone oil, methylphenylsilicone oil, methylchlorophenylsilicone oil, branched dimethylsilicone oil, methylhydrogensilicone oil, etc. Among these, dimethylsilicone oil and methylphenylsilicone oil are preferred, and dimethylsilicone oil is most preferred.

The silicone blends used herein may contain silicone rubber (solid component) and silicone oil (liquid component) in a weight ratio between 2:8 and 8:2, and more preferably about 4:6. Provided that the blend totals to 10 parts by weight, more than 8 parts of silicone rubber produces such a highly viscous solution that silicone deposits on the hollow fiber substrate wall surface are difficult to remove. Less than 2 parts of silicone rubber is insufficient to prevent the blended silicone oil from flowing out into the contacting blood.

The silicone rubber or silicone blend are applied in the form of a solution of 20 to 80% by weight, and preferably 30 to 60% by weight. Examples of the solvent include benzene, toluene, xylene, hexane, dichloromethane, methyl ethyl ketone, difluoroethane, ethyl acetate, trifluorotrichloroethane (Freon ®), etc.

The liquid or cleaning liquid for substantially removing the silicone rubber or silicone blend that has deposited on the hollow fiber substrate wall surface should be a non-solvent for the silicone, for ex alcohols because the once impregnated silicone is otherwise dissolved out. The cleaning liquids used may preferably have a viscosity of at least 10 centipoise, and particularly 30 to 80 centipoise at room temperature. Such cleaning liquids are effective in removing an excess of silicone rubber or silicone blend, ensuring the production of silicone-filled membranes having uniform quality and stable performance.

The cleaning liquid may contain therein 10% by volume or less, particularly 0.5 to 10% by volume, and most preferably 2 to 6% by volume of the solvent for silicone as mentioned above while maintaining the viscosity in the above-defined range. Then an excessive silicone is readily removed to provide further improved performance. If more than 10% by volume of the solvent for silicone is present in the cleaning liquid, the necessary portion of the silicone filling can be dissolved out.

Examples of the cleaning liquid are blends of toluene and propylene glycol, toluene and dipropylene glycol, dichloromethane and diethylene glycol, dichloroethane and ethylene glycol, methyl ethyl ketone and ethylene glycol, and the like.

The substantial removal of the silicone compound as used herein means that the layer of silicone compound deposited on the inner wall of hollow fiber membranes is reduced to a thickness of 500 Å or less. A silicone compound layer having a thickness of less than 500 Å has little influence on the gas permeation through the membranes and ensures sufficient permeation of $CO_2$ as will be described hereinafter.

According to a broader aspect of the present invention, all the micropores in the membrane need not be completely filled or plugged with the silicone compound. That is, substantial filling is satisfactory, which means that at least 90% of the micropores (in number) are filled with the silicone compound. Preferably, 95% of the micropores (in number) are filled with the silicone compound.

In order that the hollow fiber membrane type oxygenator of the present invention can be operated for an extended period of time with little plasma leakage and practically sufficient carbon dioxide removal capacity, it is desirable to strictly control the flow rate of oxygen permeating through the silicone fillings in micropores by regulating the concentration of the silicone compound solution with which the microporous hollow fiber membranes are impregnated.

More illustratively, provided that the oxygen flow rate designated $O_2$ Flux and expressed in ml/min.m².mmHg is represented by equation (1), it must meet equation (2) given below.

$$O_2 \text{ Flux} = Q/\Delta P \times A \quad (1)$$

$$1.0 \leq O_2 \text{ Flux} \leq 50 \quad (2)$$

wherein Q is a volume of oxygen permeated expressed in ml/min., ΔP is a pressure drop across the membrane expressed in mmHg, and A is the surface area of the membrane expressed in m².

O₂ Flux may be obtained by measuring the volume of oxygen permeated and the pressure drop in an actual oxygenator assembled from membranes and operating under conditions such that the flow rate of gas is 300 to 3,000 ml/min. per unit membrane area(/m²). If O₂ Flux is less than 1.0 ml/min.m².mmHg, then carbon dioxide removal capacity is too low. Plasma leakage is considerably increased at O₂ Flux of higher than 50 ml/min.m².mmHg.

In order that the hollow fiber membranes in the oxygenator constructed according to the present invention can operate as gas-exchange membranes for an extended period of blood circulation with little plasma leakage and practically sufficient carbon dioxide removal capacity, it is desirable that the actual total weight SW expressed in gram of the silicone compound filling in micropores in the hollow fiber membranes and the various dimensions of the porous hollow fiber substrate meet the following equation:

$$0.3W \leq SW \leq 0.9W \quad (3)$$

wherein $$W = \frac{\pi}{4}(D_0^2 - D_1^2) \cdot L \cdot P \cdot d$$

$D_0$: hollow fiber inner diameter (0.01 to 0.1 cm),
$D_1$: hollow fiber outer diameter equal to $D_0+21$ (0.011 to 0.14 cm),
L: hollow fiber length (preferably, 5 to 30 cm),
P: hollow fiber membrane porosity (20 to 80%), and
d: silicone compound specific gravity (generally 0.8 to 1.2).

In equation (3), W is a term representative of the theoretical total weight of the silicone compound provided that all the micropores in the hollow fiber membranes are fully filled with the silicone compound. Equation (3) thus means that the actual total weight of the silicone compound filling or remaining in micropores should be controlled so as to range from 30% to 90% of the theoretical total weight. If SW is less than 0.3W, plasma leakage is considerably increased beyond a practically acceptable level. If SW is more than 0.9W, carbon dioxide removal capacity is somewhat reduced.

As previously described, the present invention allows a layer of the silicone compound as thin as 500 Å or less to remain on the inner or outer wall of hollow fiber membranes. According to a broader aspect of the present invention, SW can be as great as about 120% of the theoretical total weight W (that is, SW≤1.2W), although it is less desirable. According to a narrower aspect of the present invention, better results are obtained when most micropores (in number) are partially (in volume) filled with the silicone compound so as to meet equation (3).

The amount of the silicone compound filled may be controlled by regulating the concentration of the silicone compound solution, the proportion of the solvent for silicone in the cleaning liquid, and the like.

According to the method of the present invention, the hollow fiber membranes are assembled in a module, impregnated with the silicone compound, that is, silicone rubber or silicone rubber-silicone oil blend, and then purged of the excessive silicone compound with a cleaning liquid in the form of a mixture of a solvent and a non-solvent for silicone. As compared with the previous process wherein hollow fiber membranes are impregnated with the silicone compound before they are assembled in a module, this process has several benefits that a coating apparatus of smaller size may be used, bonding of hollow fibers to each other is avoided, and probable separation of hollow fibers from the partition due to poor bond between potting material and silicone is avoided. Removal of excess silicone from the side wall eventually render the silicone fillings in micropores uniform. In addition, there is excluded the possibility that hollow fibers are blocked or clogged.

However, there still remains in the impregnating step the possibility that the silicone compound penetrates out of the hollow fibers through micropores onto their outer wall to render the silicone fillings in micropores less uniform and hence, the membrane performance less stable. The following attention may preferably be paid in impregnating hollow fibers with a silicone compound solution.

After the hollow fiber membrane substrates 33 in a bundle are assembled in an oxygenator module, either the first fluid chamber or the second fluid chamber is filled with a filling liquid A. Then, a silicone compound solution is introduced into the remaining fluid chamber which is not filled with filling liquid A.

Figure 5A:
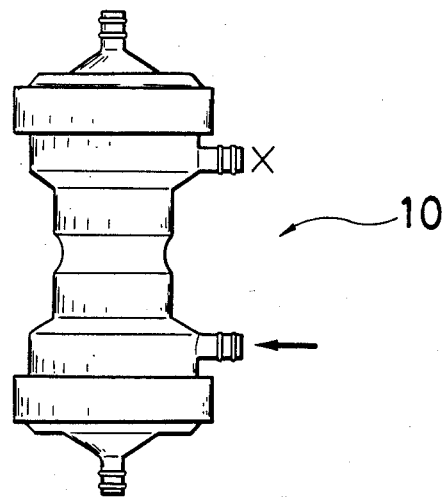
FIGS. 5a, 5b, 6a, 6b and 7a, 7b illustrate another embodiment of the oxygenator manufacturing method according to the present invention.
Figure 5B:
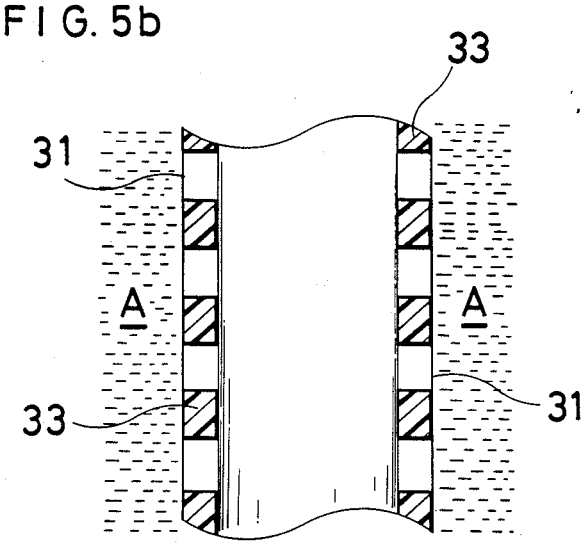
Figure 6A:
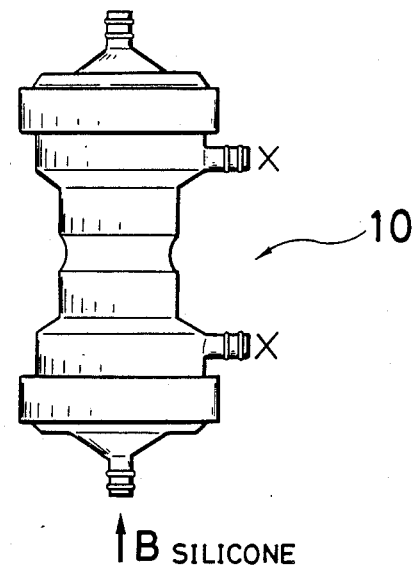
Figure 6B:
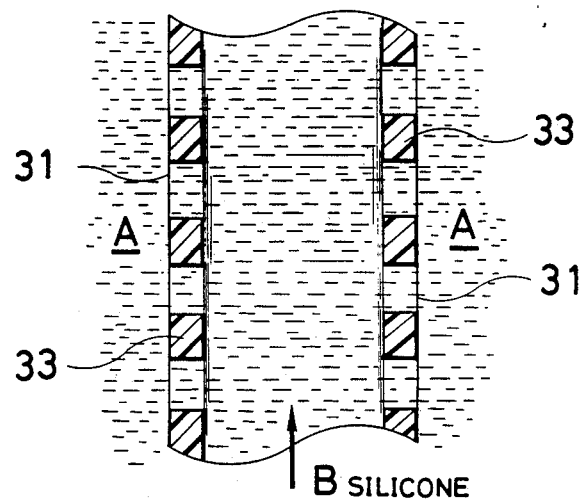

Preferably, the first fluid chamber (23 in FIG. 1) is filled with filling liquid A as shown in FIGS. 5a and 5b. Then, silicone compound solution designated by arrow B is introduced into the second fluid chamber (19, 21 in FIG. 1) in communication with the interior space of the hollow fiber membrane substrates 33 as shown in FIGS. 6a and 6b. If a starting silicone compound solution is introduced into the first fluid chamber (23), that is, to the outside of the hollow fiber membranes, it becomes sometimes difficult to remove the silicone compound from the outer wall of the hollow fiber membranes.

The impregnating step will be further explained in conjunction with this embodiment wherein the first fluid chamber is filled with filling liquid A and silicone compound solution B is introduced into the second chamber.

With the first fluid chamber full of filling liquid A, the hollow fiber membrane substrates 33 are fully impregnated with a starting silicone compound solution B as shown in FIG. 6b, which is then discharged out of the module. Next, cleaning liquid comprising a solvent and a non-solvent for silicone is introduced into the second fluid chamber as shown by arrow C in FIG. 7a and passed through at least the interior space of the hollow fibers or substrates 33 as shown in FIG. 7b. Thereafter, the module is purged or emptied of filling liquid A.

If desired, after the silicone compound solution is drained out of the interior space of the hollow fiber membrane substrates 33, a gas may be passed through the hollow fiber membrane substrates. Those excessive portions of the silicone compound which would clog in the hollow fiber membrane substrates and deposit on the inner wall thereof are more or less driven out to assist in increasing the efficiency of subsequent cleaning. Air may be used to this end.

Also preferably, the oxygenator as a whole may be warmed up after introducing cleaning liquid and before emptying the first fluid chamber of the filling liquid, or a warm gas may be introduced into the interior space of the hollow fiber membrane substrates. This heating promotes crosslinking of the silicone compound so as to prevent the silicone compound from flowing onto the outside of the hollow fiber membrane substrates after emptying of the filling liquid.

The filling liquid used herein has a higher surface tension than the critical surface tension of the hollow fiber membrane substrates 33. The term "critical surface tension" is a measure of the wettability of a solid mass on its surface. The solid is wettable with a liquid having a lower surface tension than the critical surface tension of the solid. The critical surface tension of a solid may be determined by measuring the contact angle of various liquids having different surface tensions on the solid surface, plotting the cosine of the contact angle of each liquid ($\cos \theta$) with respect to the surface tension of same liquid to depict a straight line, and determining a surface tension corresponding to the crossing of the straight line with the line of $\cos \theta = 1$.

Preferred examples of the filling liquid include water, glycerine, ethylene glycol, diethylene glycol, aqueous ethanol, aqueous isopropyl alcohol, etc. and mixtures thereof.

In introducing the filling liquid, favorable results are obtained by introducing the filling liquid under a pressure of about 0.5 to 3.0 kg/cm².

As described in the foregoing, the oxygenator of the invention has several benefits over prior art oxygenators using conventional porous hollow fiber membranes, including little plasma leakage in extended operation, high production efficiency, size reduction, cost reduction, and improved gas exchange efficiency due to the substantial absence of a silicone layer on the side wall of the hollow fiber membranes. Particularly when a silicone compound used is a blend of a silicone rubber with a silicone oil, the carbon dioxide removal capacity is noticeably improved over the use of a silicone rubber alone. When the silicone rubber used is a silica-free room temperature vulcanizable silicone rubber, the resulting hollow fiber membranes are effective in preventing thrombus.

Further, by strictly controlling the $O_2$ Flux through the silicone-filled micropores and the total weight of the silicone compound filling in micropores in the hollow fiber membranes, little plasma leakage occurs and sufficient carbon dioxide removal capacity is maintained even after extended circulation of blood. As a result, there is obtained an oxygenator having reduced dimensions, high gas-exchange efficiency, and high productivity in low cost.

According to the manufacturing process of the present invention, porous hollow fibers having micropores open are bundled and assembled in a housing to produce an oxygenator module before they are impregnated with a silicone compound. A relatively simple apparatus may be used in the impregnating step, leading to a reduced manufacture cost. As compared with an oxygenator unit assembled after hollow fibers are impregnated with a silicone compound, the present process provides an oxygenator without the problem of poor bond in the potting portions due to poor bondability of silicone.

The substantially uniform formation of silicone fillings or coatings substantially in micropores eliminates clogging of the hollow fibers to allow for improved blood circulation.

An oxygenator having improved and stable gas exchange performance is thus available.

If the impregnating and cleaning steps are conducted with the membrane exterior or interior filled with a predetermined filling liquid, the deposition of the silicone compound on the outer or inner wall of the hollow fiber membranes is minimized and the total weight of the silicone compound filled can be precisely controlled, both leading to stable performance.

EXAMPLE 1

An oxygenator designated module A as shown in FIG. 1 was manufactured using hollow fibers of polypropylene which were formed by axially stretching to an inner diameter of 200 μm and a wall thickness of 25 μm and had a plurality of micropores extending throughout the side wall and having an average diameter of 700 Å and a porosity of 50%. A silicone compound solution was passed through the blood flow path in module A to impregnate the fibers with the solution for 3 minutes as shown in FIGS. 3a and 3b. The silicone compound solution used was a 60% Freon ® solution of a silicone blend consisting of 40 wt % of a silica-free silicone rubber which was a two-part composition of vinylmethylsiloxane and methylhydrogensiloxane containing a chloroplatinic acid catalyst and 60 wt % of a dimethylsilicone oil.

Thereafter, air was passed through the flow path in module A and a cleaning liquid was then passed along the inner and outer surfaces of the fibers. The cleaning liquid used was a 3% toluene/dipropylene glycol solution having a viscosity of 100 centipoise. There was obtained a hollow fiber membrane type oxygenator designated module C wherein only the micropores in the hollow fibers were substantially filled with the silicone compound.

The performance of this oxygenator module C was evaluated by preparing venous blood having an oxygen saturation of 65% and a carbon dioxide partial pressure of 45 mmHg from fresh bovine blood having heparin added, and passing the blood through the module at 37° C. The blood contained 12 g hemoglobin per deciliter.

The oxygenating and carbon dioxide ($CO_2$) removal capacities of the module were evaluated by operating the module at a predetermined flow rate of blood or oxygen.

Figure 8:
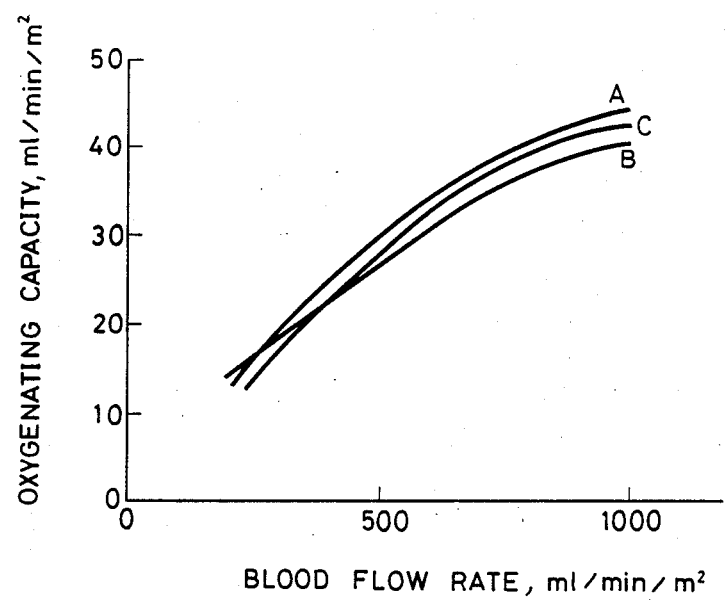
FIG. 8 is a diagram showing the oxygenating capacity of oxygenators in Example 1 as a function of the blood flow rate therethrough.
Figure 9:
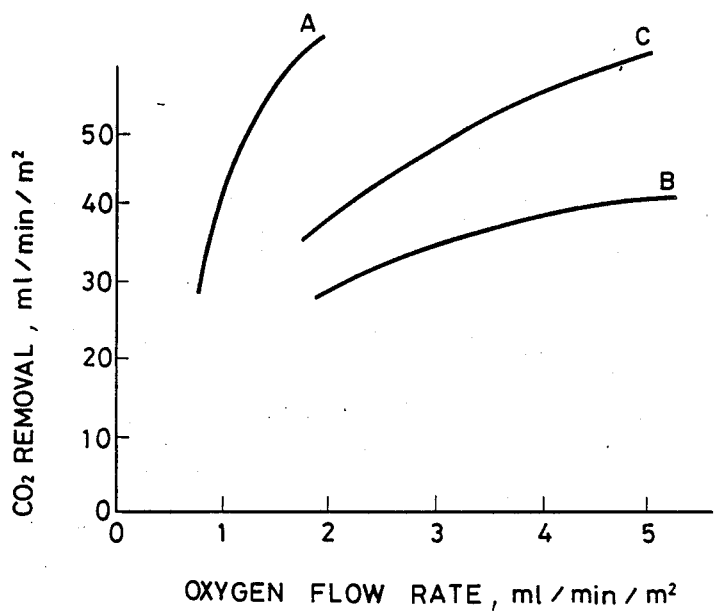
FIG. 9 is a diagram showing the $CO_2$ removal capacity of oxygenators in Example 1 as a function of the oxygen flow rate therethrough.

Curve C in FIG. 8 shows the oxygenating capacity as a function of the blood flow rate at an oxygen flow rate of 1000 ml/min/m². Curve C in FIG. 9 shows the $CO_2$ removal capacity as a function of the oxygen flow rate at a blood flow rate of 1000 ml/min/m².

Further, a partial extracorporeal venous-arterial circulation test was conducted using a dog.

Figure 10:
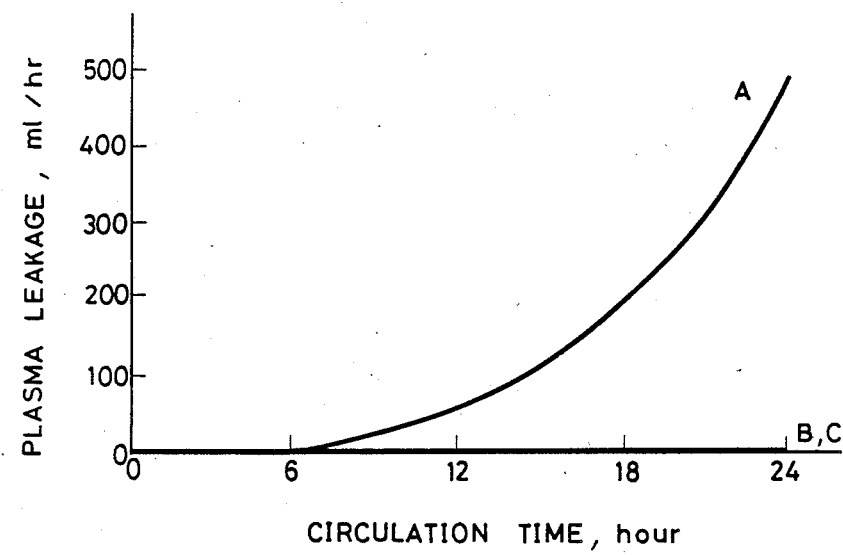
FIG. 10 is a diagram showing the plasma leakage in oxygenators in Example 1 as a function of extracorporeal circulation time.

The amount of plasma leaked is plotted as a function of circulation time to give curve C in FIG. 10.

COMPARATIVE EXAMPLE 1

Using an oxygenator in the form of module A in Example 1 in which the hollow fiber micropores remained open and were not filled with a silicone compound, tests were conducted by the same procedures as in Example 1. The results are similarly plotted in FIGS. 8, 9, and 10 as curves A.

COMPARATIVE EXAMPLE 2

An oxygenator designated module B was manufactured which was similar to module A in Example 1 except that hollow fibers of silicone were used. Using this module B, tests were conducted by the same procedures as in Example 1. The results are similarly plotted in FIGS. 8, 9, and 10 as curves B.

As seen from FIG. 8, no significant difference was observed with respect to oxygenating capacity among module A (porous PP fiber membrane, curve A), module B (silicone fiber membrane, curve B), and module C (silicone-filled PP fiber membrane, curve C) of the invention.

As to the $CO_2$ removal capacity, the silicone membrane (module or curve B) was inferior as seen from FIG. 9.

FIG. 10 based on a long term animal test shows that the amount of plasma leaked through the porous membrane (module or curve A) increased with time whereas no leakage of plasma occurred through the silicone-filled membrane (module or curve C) according to the present invention

EXAMPLE 2

An oxygenator designated module D of the same size as the module in Example 1 was manufactured by the same procedure as in Example 1 except that a silicone blend of a silica-containing silicone rubber ($SiO_2$ 30 vol %) and a silicone oil was used as the silicone compound.

Figure 11:
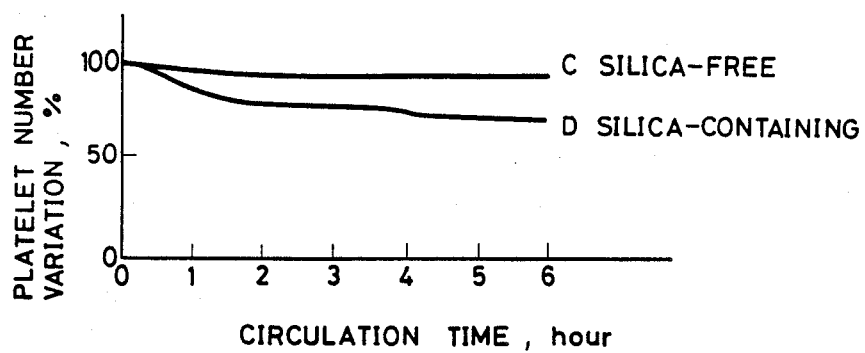
FIG. 11 is a diagram showing the variation of platelet number with extracorporeal circulation time during the operation of the oxygenators of Examples 1 and 2.

Extracorporeal circulation tests were conducted through module D of this example and module C of Example 1 using rabits. The number of platelets in circulating blood was measured at given time intervals. The percent variation of platelet number is plotted with time in FIG. 11 to give curves C and D corresponding to module C having hollow fibers treated with silica-free silicone and module D having hollow fibers treated with silica-containing silicone. FIG. 11 shows that silica-free silicone treated module C maintained the platelet number at 90% of the initial even after 6-hour operation whereas silica-containing silicone treated module D gradually reduced the platelet number to 70% of the initial after 6-hour operation.

EXAMPLE 3

Oxygenators designated modules E to I as shown in FIG. 1 were manufactured using hollow fibers of polypropylene which were formed by axially stretching to an inner diameter of 200 μm and a wall thickness of 25 μm and had a plurality of micropores extending throughout the side wall and having an average diameter of 700 Å and a porosity of 45%. The fibers had a total membrane area of 1.6 m². A silicone compound solution was passed through the blood flow path in the module to impregnate the fibers with the solution for 3 minutes. The silicone compound solution used was a 60% Freon ® solution of a silicone blend consisting of a silicone rubber which was a two-part composition of vinylmethylsiloxane and methylhydrogensiloxane containing a chloroplatinic acid catalyst and a dimethylsilicone oil.

Thereafter, air was passed through the flow path in the module and a cleaning liquid was then passed along the inner and outer surfaces of the fibers. The cleaning liquid used was a toluene/dipropylene glycol solution having different toluene concentration. There was obtained hollow fiber membrane type oxygenators designated modules E to I wherein only the micropores in the hollow fibers were substantially filled with the silicone compound.

Modules E to I were the same except that the toluene/dipropylene glycol solutions used for cleaning had different toluene concentrations as shown in Table 1. The modules were operated with the volume of oxygen permeated set to 500 ml/min. and oxygen flow rate, $O_2$ Flux, was measured. The results are shown in Table 1.

TABLE 1

| Module | Toluene concentration in cleaning liquid, % | $O_2$ Flux, ml/min.m².mmHg |
|---|---|---|
| E | 0 | 0.8 |
| F | 3.0 | 1.5 |
| G | 5.0 | 10.8 |
| H | 10.0 | 47.0 |
| I | 15.0 | 98.0 |

The performance of these oxygenator modules E to I was evaluated by preparing venous blood having an oxygen saturation of 65% and a carbon dioxide partial pressure of 45 mmHg from fresh bovine blood having heparin added, and passing the blood through the modules at 37° C. The blood contained 12 g hemoglobin per deciliter.

Figure 12:
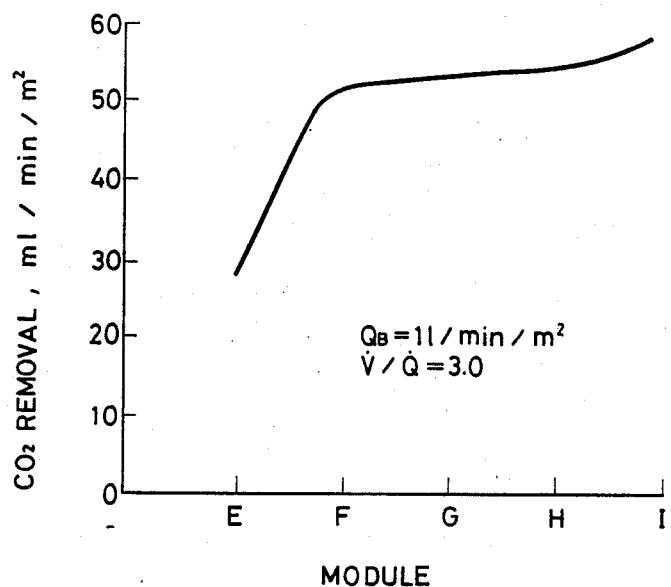
FIG. 12 is a diagram showing the $CO_2$ removal capacity of different modules in Example 3.

The carbon dioxide ($CO_2$) removal capacity of the modules was evaluated by operating them at predetermined flow rates of blood and oxygen, that is, blood flow rate 1000 ml/min/m² and oxygen flow rate 3000 ml/min/m². The results are shown in FIG. 12. Module E was practically insufficient in $CO_2$ removal.

Further, a partial extracorporeal venous-arterial circulation test was conducted using a dog.

Figure 13:
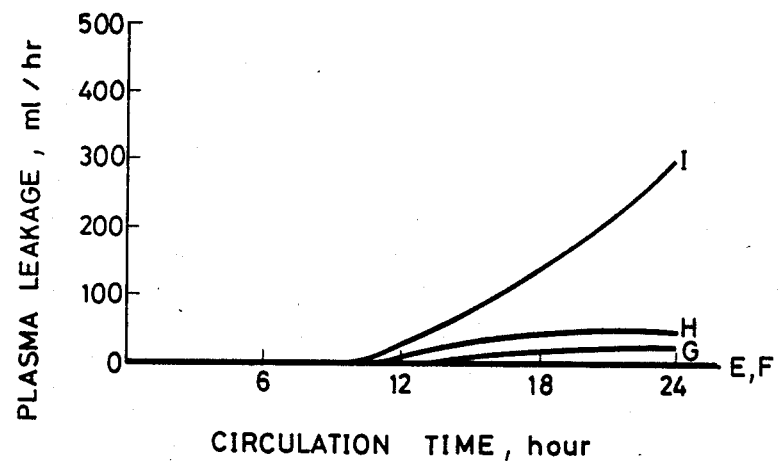
FIG. 13 is a diagram showing the plasma leakage in different oxygenators in Example 3 as a function of extracorporeal circulation time.

The amount of plasma leaked is plotted as a function of circulation time in FIG. 13. As seen from FIG. 13, a considerable volume of plasma leaked in module I. Plasma leaked in modules G and H, but to a physiologically neglectable extent. Curves G and H reached plateaus beyond which plasma leakage did not increase. No leakage of plasma occurred in modules E and F.

Module F was satisfactory in both $CO_2$ removal and plasma leakage.

EXAMPLE 4

Oxygenators designated modules J to M as shown in FIG. 1 was manufacatured using the same hollow polypropylene fibers as in Example 3, that is, having an outer diameter $D_1$ of 250 μm, an inner diameter $D_0$ of 200 μm, a porosity P of 45%, and a length L of 13 cm. The fibers had a total membrane area of 1.6 m².

The fibers were impregnated with a silicone compound of a RTV silicone rubber and a silicone oil in solution form followed by curing. More illustratively, a silicone compound solution was passed through each prefabricated module to impregnate the fibers with the solution for 3 minutes. The silicone compound solution used was a Freon ® solution of a silicone blend consisting of 40 wt % of a silicone rubber which was a two-part composition of vinylmethylsiloxane and methylhydrogensiloxane containing a chloroplatinic acid catalyst and 60 wt % of a dimethylsilicone oil. Thereafter, air was passed through the module and a 3% toluene/dipropylene glycol solution was then passed along the inner and outer surfaces of the fibers for cleaning. As a result, essentially only the micropores were filled with the silicone compound.

The weight of the silicone compound filling in the micropores was controlled by varying the concentration of the silicone compound in the impregnating solution as shown in Table 2. The amount of silicone compound impregnated and SW/W are also shown in Table 2.

TABLE 2

| Module | Silicone compound concentration, wt % | Weight of silicone compound impregnated, g | SW/W |
|---|---|---|---|
| J | 30 | 4.2 | 0.2 |
| K | 50 | 6.2 | 0.3 |
| L | 70 | 18.7 | 0.9 |
| M | 90 | 20.8 | 1.0 |

Modules K and L met equation (3), that is, the actual silicone weight SW was controlled between 30% and 90% of the theoretical silicone weight W. For comparison purpose, module J had a SW equal to 0.2W and module M had a SW equal to 1.0.

These four modules were evaluated for carbon dioxide removal capacity and plasma leakage prevention.

The performance of these oxygenator modules J to M was evaluated by preparing venous blood having an oxygen saturation of 65% and a carbon dioxide partial pressure of 45 mmHg from fresh bovine blood having heparin added, and passing the blood through the module at 37° C. The blood contained 12 g hemoglobin per deciliter.

Figure 14:
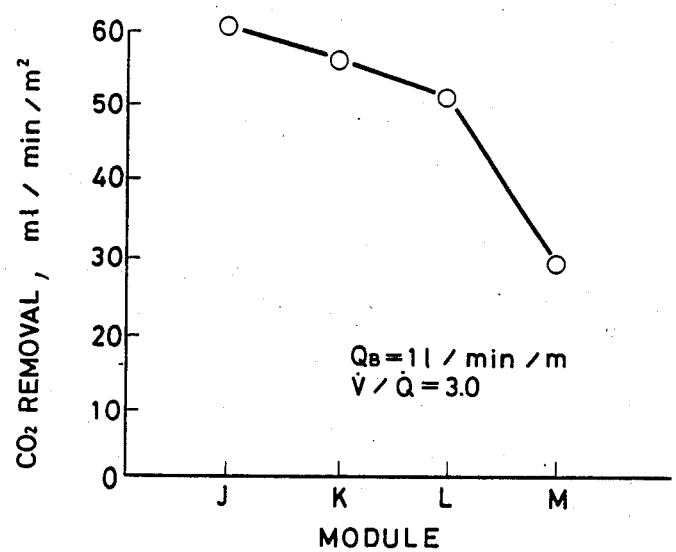
FIG. 14 is a diagram showing the $CO_2$ removal capacity of different modules in Example 4.

The $CO_2$ removal capacity of the modules was measured at a blood flow rate $Q_B$ of 1000 ml/min/m$^2$ and a V/Q of 3.0, with the results shown in FIG. 14.

Further, a partial extracorporeal venous-arterial circulation test was conducted using a dog. The amount of plasma leaked is plotted as a function of circulation time to give curves J to M in FIG. 15.

Figure 15:
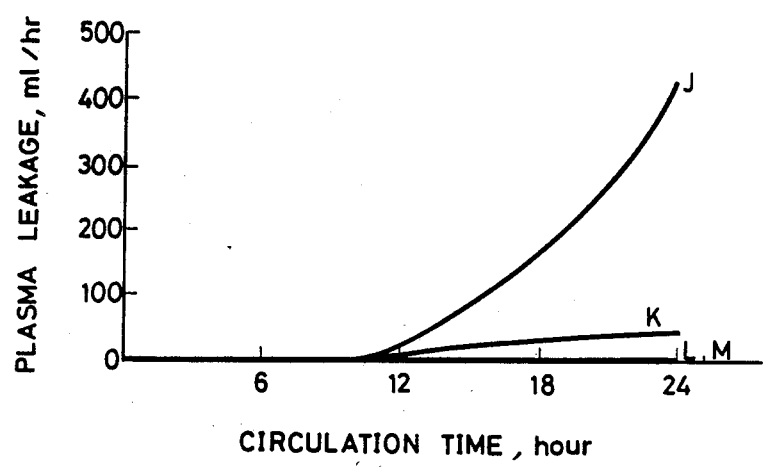
FIG. 15 is a diagram showing the plasma leakage in different oxygenators in Example 4 as a function of extracorporeal circulation time.

As seen from FIGS. 14 and 15, modules K and L are most preferred in plasma leakage.

EXAMPLE 5

An oxygenator designated module N as shown in FIG. 1 was manufactured using hollow fibers of polypropylene which were formed by axially stretching to an inner diameter of 200 μm and a wall thickness of 25 μm and had a plurality of micropores extending throughout the side wall and having an average diameter of 700 Å and a porosity of 50%. The fibers had a membrane area of 1.0 m$^2$.

Water was introduced as the filling liquid A into the first fluid chamber of the module under a pressure of 2.0 kg/m$^2$ as shown in FIGS. 5a and 5b.

A silicone compound solution B was passed through the blood flow path in module N to impregnate the fibers with the solution for 3 minutes as shown in FIGS. 6a and 6b. The silicone compound solution used was a 60% Freon ® solution of a silicone blend consisting of 40 wt % of a two-part silicone rubber of vinylmethylsiloxane and methylhydrogensiloxane containing a chloroplatinic acid catalyst and 60 wt % of a dimethylsilicone oil.

Figure 7A:
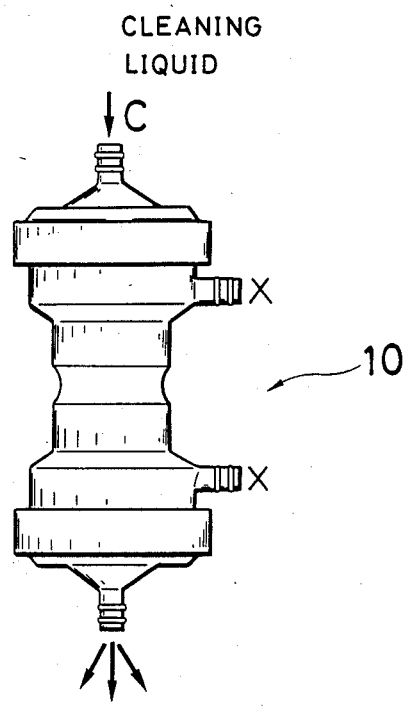
Figure 7B:
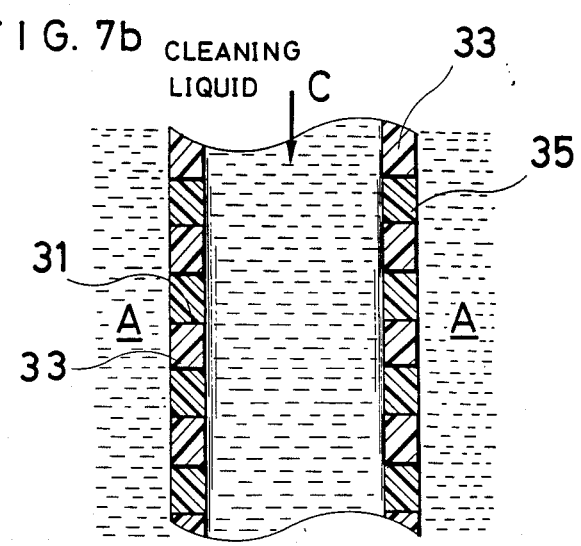

Thereafter, air was passed through the flow path in module N and a cleaning liquid was then passed along the inner surface of the fibers as shown by arrow C in FIGS. 7a and 7b to thereby empty the module of the filling liquid or water. The cleaning liquid used was a 3% toluene/dipropylene glycol solution having a viscosity of 100 centipoise. There was obtained a hollow fiber membrane type oxygenator designated module N wherein only the micropores in the hollow fibers were substantially filled with the silicone compound.

It should be noted that water had a surface tension of 72 dyn/cm and the outer surface of the hollow fiber membrane used had a critical surface tension of 30 dyn/cm.

The performance of this oxygenator module N was evaluated by preparing venous blood having an oxygen saturation of 65% and a carbon dioxide partial pressure of 45 mmHg from fresh bovine blood having heparin added, and passing the blood through the module at 37° C. The blood contained 12 g hemoglobin per deciliter.

The oxygenating and carbon dioxide ($CO_2$) removal capacities of the module were evaluated by operating the module at a predetermined flow rate of blood or oxygen.

Figure 16:
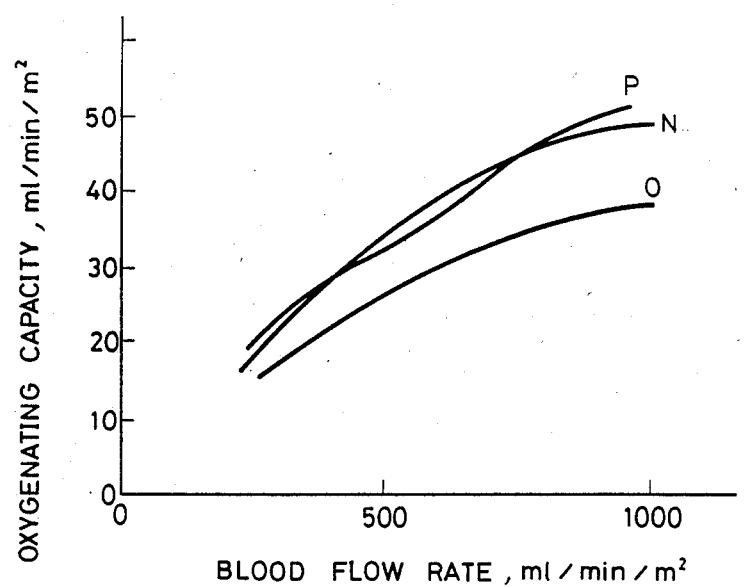
FIG. 16 is a diagram showing the oxygenating capacity of oxygenators in Example 5 as a function of the blood flow rate therethrough.
Figure 17:
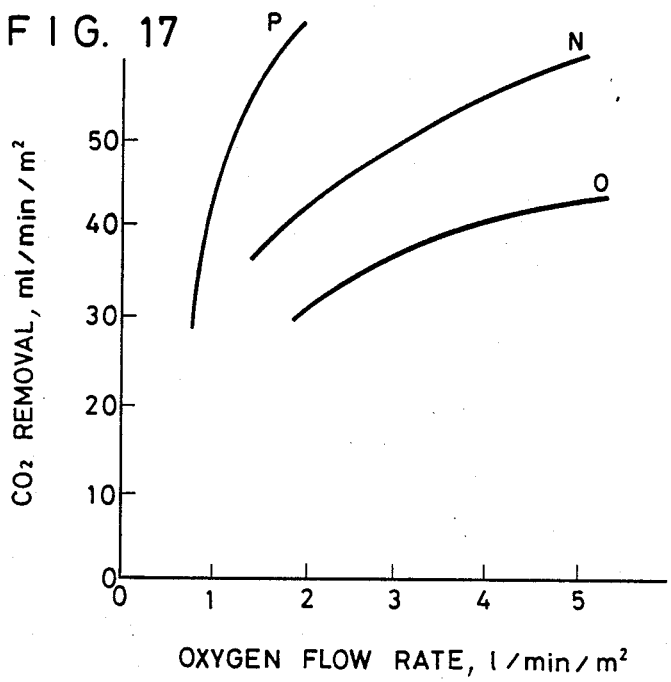
FIG. 17 is a diagram showing the $CO_2$ removal capacity of oxygenators in Example 5 as a function of the oxygen flow rate therethrough.

Curve N in FIG. 16 shows the oxygenating capacity as a function of the blood flow rate at an oxygen flow rate of 1000 ml/min/m$^2$. Curve N in FIG. 17 shows the $CO_2$ removal capacity as a function of the oxygen flow rate at a blood flow rate of 1000 ml/min/m$^2$.

Further, a partial extracorporeal venous-arterial circulation test was conducted using a dog.

The amount of plasma leaked is plotted as a function of circulation time to give curve N in FIG. 18.

The foregoing procedure was repeated except that the first fluid chamber was not filled with water or filling liquid. The resulting module designated O was evaluated for the same properties as above and the results are plotted in FIGS. 16, 17 and 18 as curves O.

Using an oxygenator in the form of module N in Example 5 in which the hollow fiber micropores remained open and were not filled with a silicone compound, tests were conducted by the same procedures as in Example 5. The results are similarly plotted in FIGS. 16, 17, and 18 as curves P.

As seen from FIGS. 16, 17, and 18, module N having hollow fibers treated with silicone compound in the presence of water outside the fibers is further improved over module O having hollow fibers treated with the silicone compound in the absence of water outside the fibers. That is, module N provides the best performance.

What is claimed is:

1. A hollow fiber membrane type oxygenator comprising
   a housing,
   a bundle of a plurality of gas-exchange hollow fiber membranes axially extending through the housing,
   a first fluid chamber defined by the outer surface of said hollow fibers and the inner surface of said housing,
   a first fluid inlet and a first fluid outlet both in fluid communication with said first fluid chamber,
   a partition supporting either end of said hollow fibers and isolating the fiber end from said first fluid chamber, and
   a second fluid inlet and a second fluid outlet both in fluid communication with the interior space of said hollow fibers, characterized in that
   each said hollow fiber membrane has a plurality of micropores extending throughout the membrane, the micropores are substantially filled with a silicone blend comprising a silicone rubber and a silicone oil, but the hollow fiber membrane is free of a layer of said silicone blend on each of its internal and external walls of more than 500 Å.

2. A hollow fiber oxygenator according to claim 1 wherein said silicone rubber and said silicone oil are present in a weight ratio between 2:8 and 8:2.

3. A hollow fiber oxygenator according to claim 2 wherein said silicon oil is dimethyl or methylphenyl silicone oil.

4. A hollow fiber oxygenator according to claim 1 wherein said silicone rubber is a room temperature vulcanizable silica-free silicone rubber.

5. A hollow fiber oxygenator according to claim 4 wherein said room temperature vulcanizable silica-free silicone rubber is a polymer of vinylmethylsiloxane units and methylhydrogensiloxane units.

6. A hollow fiber oxygenator according to claim 1, wherein each said hollow fiber membrane comprises a hollow porous fiber substrate having an inner diameter of 100 to 1,000 μm, a wall thickness of 5 to 200 μm, an average pore diameter of 0.01 to 5 μm, and a porosity of 20 to 80%, whereby the oxygen flow rate, $O_2$ Flux, represented by the following equation:

$$O_2\ Flux = Q/(\Delta P \times A)$$

is within the range of from 1.0 to 50 ml/min.m².mmHg, wherein Q is a volume of oxygen permeated through the membrane expressed in ml/min., ΔP is a pressure drop across the membrane expressed in mmHg, and A is the surface area of the membrane expressed in m².

7. A hollow fiber oxygenator according to claim 6 wherein said silicone rubber and said silicone oil are present in a weight ratio between 2:8 and 8:2.

8. A hollow fiber oxygenator according to claim 6 wherein said silicone rubber is a room temperature vulcanizable silicone rubber.

9. A hollow fiber oxygenator according to claim 8 wherein said room temperature vulcanizable silicone rubber is a polymer of vinylmethylsiloxane units and methylhydrogensiloxane units.

10. A hollow fiber oxygenator according to claim 1 wherein each said hollow fiber membrane comprises a hollow porous fiber substrate having an inner diameter of 100 to 1,000 μm, a wall thickness of 5 to 200 μm, an average pore diameter of 0.01 to 5 μm, and a porosity 20 to 80%, the weight SW of the silicone compound filled in the fiber membrane micropores is within the following range:

$$\frac{\pi}{4}(D_0^2 - D_1^2) \cdot L \cdot P \cdot d \cdot 0.3 \leq SW \leq$$

-continued
$$\frac{\pi}{4}(D_0^2 - D_1^2) \cdot L \cdot P \cdot d \cdot 0.9$$

with the proviso that the hollow fber has an outer diameter $D_0$, an inner diameter $D_1$, a length L, and a porosity P, and the silicone compound has a specific gravity d.

11. A hollow fiber oxygenator according to claim 10 wherein said silicone rubber and said silicone oil are present in a weight ratio between 2:8 and 8:2.

12. A hollow fiber oxygenator according to claim 10 wherein said silicone rubber is a room temperature vulcanizable silicone rubber.

13. A hollow fiber oxygenator according to claim 12 wherein said room temperature vulcanizable silicone rubber is a polymer of vinylmethylsiloxane units and methylhydrogensiloxane units.

14. A hollow fiber membrane type oxygenator comprising a housing having an inner surface, a bundle of a plurality of hollow microporous gas-exchange fibers axially extending through the housing, each of said fibers having external and internal surfaces, and defining an interior space within the internal surface, a first fluid chamber defined by the outer surfaces of said hollow fibers and the inner surface of said housing, a first fluid inlet and a first fluid outlet both in fluid communication with said first fluid chamber, a partition supporting either end of said hollow fibers and isolating the supported fiber end from said first fluid chamber, and a second fluid inlet and a second fluid outlet both in fluid communication with the interior space of said hollow fibers, wherein said plurality of hollow microporous fibers are treated by introducing a solution of a silicone blend of a silicone rubber and a silicone oil in a suitable solvent into the interior space of the hollow fibers, thereby filling the micropores in the fibers with the silicone blend, and thereafter, passing a cleaning liquid comprising a mixture of a non-solvent and a solvent for the silicone blend through the interior space of the hollow fibers and said fluid chamber in order to remove from the external and internal surfaces of the hollow fibers at least the portion of the layer of silicone blend of more than 500 Å thickness.

15. A hollow fiber membrane type oxygenator according to claim 14, wherein the cleaning liquid has a viscosity of at least 10 centipoise at room temperature.

16. A hollow fiber membrane type oxygenator according to claim 14, wherein said silicone rubber and said silicone oil are present in a weight ratio between 2:8 and 8:2.

17. A hollow fiber membrane type oxygenator according to claim 14, wherein said silicone rubber is a room temperature vulcanizable silicone rubber.

* * * * *

UNITED STATES PATENT AND TRADEMARK OFFICE
CERTIFICATE OF CORRECTION

PATENT NO. : 4,923,679

DATED : May 8, 1990

INVENTOR(S) : FUKASAWA et al

It is certified that error appears in the above-identified patent and that said Letters Patent is hereby corrected as shown below:

Column 6, line 52, change "havinig" to --having--.

Column 8, line 18, change "ex" to --example--.

Column 13, line 33, change "rabits" to --rabbits--.

Column 17, claim 10, line 50, following "porosity", insert --of--.

Column 17, claim 10, line 51, following "80%", insert --and--.

Column 18, claim 10, line 5, change "fber" to --fiber--.

Signed and Sealed this

Twenty-first Day of July, 1992

*Attest:*

DOUGLAS B. COMER

*Attesting Officer*     *Acting Commissioner of Patents and Trademarks*